A. McCARTE.
FLASK FILLING APPARATUS.
APPLICATION FILED FEB. 13, 1912.

1,134,398.

Patented Apr. 6, 1915.
4 SHEETS—SHEET 1.

Fig. 1.

WITNESSES:

INVENTOR
Alexander McCarte
BY
Henry J Miller
ATTORNEY

A. McCARTE.
FLASK FILLING APPARATUS.
APPLICATION FILED FEB. 13, 1912.

1,134,398.

Patented Apr. 6, 1915.
4 SHEETS—SHEET 3.

WITNESSES:

INVENTOR
Alexander McCarte
BY
Henry J Miller
ATTORNEY

A. McCARTE.
FLASK FILLING APPARATUS.
APPLICATION FILED FEB. 13, 1912.

1,134,398.

Patented Apr. 6, 1915.
4 SHEETS—SHEET 4.

WITNESSES:

INVENTOR
Alexander McCarte
BY
Henry J Miller
ATTORNEY

UNITED STATES PATENT OFFICE.

ALEXANDER McCARTE, OF NEWARK, NEW JERSEY, ASSIGNOR TO THE SINGER MANUFACTURING COMPANY, A CORPORATION OF NEW JERSEY.

FLASK-FILLING APPARATUS.

1,134,398.  Specification of Letters Patent.  Patented Apr. 6, 1915.

Application filed February 13, 1912. Serial No. 677,332.

*To all whom it may concern:*

Be it known that I, ALEXANDER MCCARTE, a citizen of the United States, residing at Newark, in the county of Essex and State of New Jersey, have invented certain new and useful Improvements in Flask-Filling Apparatus, of which the following is a specification, reference being had therein to the accompanying drawings.

This invention relates more particularly to an improvement in that class of sand-molding machines illustrated in my application for patent filed January 12, 1911, Serial No. 602,354, and comprising a traveling flask-support with means for imparting to it operative movements such that a flask supported thereon is moved between and is arrested at each of a plurality of stations in each excursion of the support from initial position, combined with successively acting flask-filling, tucking and strike-off means disposed at one of said stations and mold-pressing means disposed at another of said stations.

The invention has for its object to provide an effective automatically actuated flask-filling apparatus for such an organism.

In its preferred form, the improvement comprises a hopper beneath which is mounted for reciprocation a sand-box with an adjacent shelf serving as a bottom for the hopper when the sand-box is retracted therefrom, and a bottom for the sand-box having a traverse equal to that of the latter and adapted for movement independently thereof; whereby a charge of sand is carried from beneath the hopper into filling position and the bottom is then retracted to deposit the sand in the empty flask preparatory to the return of the sand-box for the succeeding charge. While the sand-box is in filling position and its bottom withdrawn, a tucking member descends through the sand-box and packs the sand around the pattern preparatory to the return of the sand-box which strikes off the superfluous sand from the top of the flask.

The tucker operating mechanism is so constructed and arranged that its stroke may be varied in the production of the cope and drag sections of the mold. The present improvement includes various constructive features for insuring the certainty of action and the durability of the apparatus under regular working conditions.

The invention will be understood by reference to the accompanying drawings, in which—

Fig. 10 is a perspective view of the sand-plate. Fig. 11 is a perspective view of the sand-box. Fig. 12 is a plan, Fig. 13 an end elevation, and Fig. 14 a side elevation, with certain parts in section, representing the hydraulic valve mechanism for operating certain of the moving parts. Fig. 15 is an elevation taken at the opposite side from that of Fig. 2 and representing the means for automatically varying the operative stroke of the tucker. Figs. 16, 17 and 18 are detail views representing portions of the tucker-stroke varying means.

The several groups of apparatus of the machine are mounted upon a common bed-plate 1 provided with a well 2 upon the margin of which rests the bottom flange 3 of the turret-frame 4 provided with a central bearing boss 5 in which is journaled the tubular hub 6 of the rotary turret 7 which is in practice provided with a series of flask-supports 8 each adapted to sustain a flask 9. Sustained within the flask-support 8 for vertical movement relative thereto is the pattern-support 10 upon which rests the pattern-plate 11 having the pattern 12 secured thereto. In practice the upper face of the pattern-plate 11 is sustained slightly below the bottom of the flask during the sand-filling and tucking operations, and after the movement of the turret thereafter to bring the filled flask within the range of action of the compressing apparatus, the pattern-support 10 is forced upwardly by the press-platen sufficiently to bring the upper face of the pattern-plate 11 flush with the bottom of the flask, thereby compressing the contained sand within the flask against the thrust platen above the same.
Secured upon the bed-plate by means of bolts $13^x$ is the foot 13 of a hollow cylindrical standard 14 surmounted by the cap-plate 15 secured thereon by the screws 16 and provided with a central threaded aperture. The standard is faced off in its upper and lower portions to afford bearings to which are fitted the corresponding portions of a split sleeve 17 having the longitudinal slit 18 and spaced lugs 19 adapted to be drawn together by means of the bolt 20 to insure a close fit of the sleeve upon the standard. The sleeve 17 is provided at the bottom with a lateral flange 21 having in its under side an aperture 22 entered by the enlarged head 23 of a steady bolt 24 clamped within an aperture in the base 13 by means of the nut 25 whereby the sleeve is permitted to be adjusted vertically upon the standard but is prevented from turning thereon. The sleeve 17 is provided at its upper end with a cap-plate 26 secured thereon by means of bolts 27 and provided with a central aperture in which is journaled the shouldered adjusting screw 28 whose threaded lower portion enters the central aperture of the cap-plate 15 of the standard, and by turning the adjusting screw by means of a wrench applied to its squared head 29, the sleeve may be raised or lowered upon its fixed supporting standard. The said sleeve forms a member of a frame comprising the webs 30 extending therefrom upwardly and divergently above the top of the sleeve and terminating in spaced flanges 31 to which are secured by means of bolts 32 the parallel side members 33 of a substantially rectangular horizontal frame joined together by means of the end members 34.

Rising from the side members 33 is an arched tie-beam 35 formed intermediate the side members with a rectangular curb 36 whose upper face affords a flat seat 37 upon which is secured by means of screws 38 the flange 39 of a collar 40 affording a socket in which is secured the lower end of the standing rectangular tube 41 constituting the body of the sand-hopper or magazine.

Figure 8:
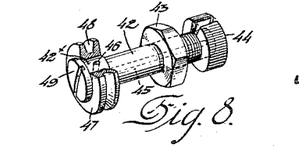
Fig. 8 is a perspective view of one of the supporting rollers of the sand-box with its supporting stud.
Figure 9:
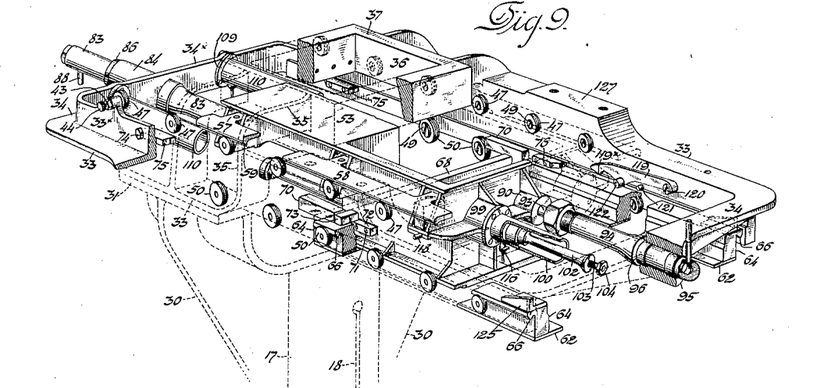
Fig. 9 is a perspective view of the body of the frame with the sand-box and sand-plate and their operating devices, with certain portions of the frame broken away to expose the parts within the same.

Passing through the ribs $33^x$ extending along the inner edges of the frame members 33 is a series of shouldered stud-bolts 42 each secured in position by means of a clamp-nut 43 applied to its threaded outer portion and carrying upon its outer extremity, as represented in detail in Fig. 8, a chambered lubricant-carrying cap-nut 44 adapted, by screwing upon the bolt, to force the lubricant through an axial channel 45 therein and out of a lateral aperture 46 terminating in the enlarged bearing surface $42^x$ of the stud-bolt 42. Journaled upon the portion $42^x$ of each stud-bolt is a bearing and guiding roller 47 formed with a flaring peripheral groove 48 and secured in position by means of the screw 49 tapped into the stud-bolt 42. A second series of guiding and supporting rollers 50 with similar peripheral grooves 51 is mounted upon stud-bolts 42 also similar to those just described, the second series of rollers having their operative upper sides in a plane beneath those of the rollers 47.

The sand-box 52 is of rectangular shape and open at the top and bottom and corresponds substantially in length and width with the sand-hopper. At the rearward end and flush with its top it is provided with a sand-supporting or cut-off extension-plate 53 adapted to form a bottom for the sand-hopper when the sand-box is moved from beneath the same to carry a charge of sand to the flask to be filled. The sand-box and cut-off plate are shown formed in a single reciprocatory frame having lateral stirrups 54 containing the blocks 55 upon which are secured by means of screw-bolts 56 passing through the stirrups 54 and blocks 55 the laterally projecting ears 57 of the parallel rails 58 provided along their outer edges with depending V-shaped ribs 59 entering and resting within the grooves 48 of the bearing rollers 47. The sand-box is therefore sustained by anti-friction bearing rollers upon its supporting frame, and in such manner that it cannot be clogged by introduction of sand in the moving parts during the continued operation of the machine.

The forward wall of the sand-box has a forwardly extending flange 60 which is beveled downwardly and forwardly from the bottom of the inner face of the front wall to receive the similarly beveled knife-edge 61 at the forward end of the sand-plate 62 movable relatively to the sand-box but normally affording a bottom for retaining the sand therein. The sand-plate has secured thereon along its opposite edges by means of the screws 63 the rails 64 each provided with an outwardly extending flange 65 having a depending V-shaped rib 66 entering and resting within the grooves 51 of the bearing rollers 50, by means of which the sand-plate is sustained and guided in its reciprocatory movements beneath and parallel with those of the sand-box. The rearward end of the sand-plate has secured upon its upper face by means of screws 67 the cross-beam 68 notched at each of its extremities to form a tongue 69 overlapping the notched adjacent end of the rail 64 and crossed by the upwardly extending thrust-blocks 70 formed integral with the rails 64.

To each side of the sand-box frame is secured by means of screws 71 a block 72 having a lateral extension 73 disposed in the path of movement of the thrust-block 70 and adapted for engagement by the same when the sand-plate is shifted into operative position above a flask to produce a corresponding advance movement of the sand-box frame. Secured to the inner faces of the side members 33 of the frame by means of the tap-screws 74 are the longitudinally spaced stock-blocks 75 and 76 so disposed within the range of travel of the blocks 70 and 73, respectively, that they serve to arrest their movements in the extreme retracted position of the sand-plate and forward position of the sand-box.

Figure 1:
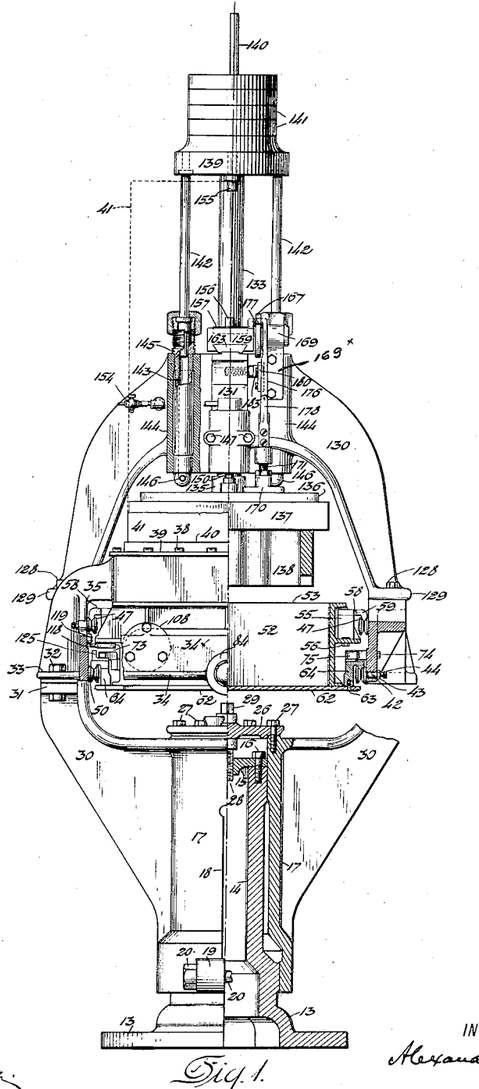
Figure 1 is an end elevation, partly in section, of an apparatus embodying the present improvements, and Fig. 2 a sectional side elevation of the same.
Figures 2, 15, 16, 17, 18:
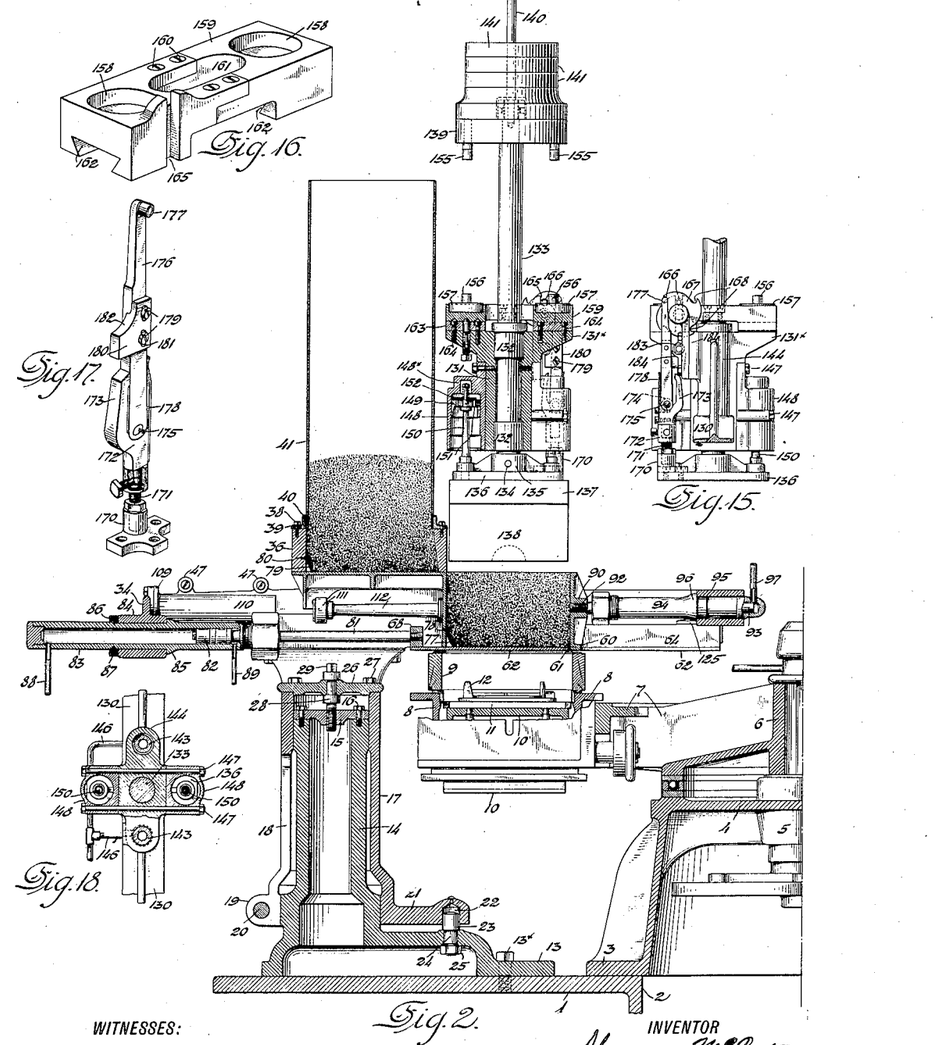
Figure 3:
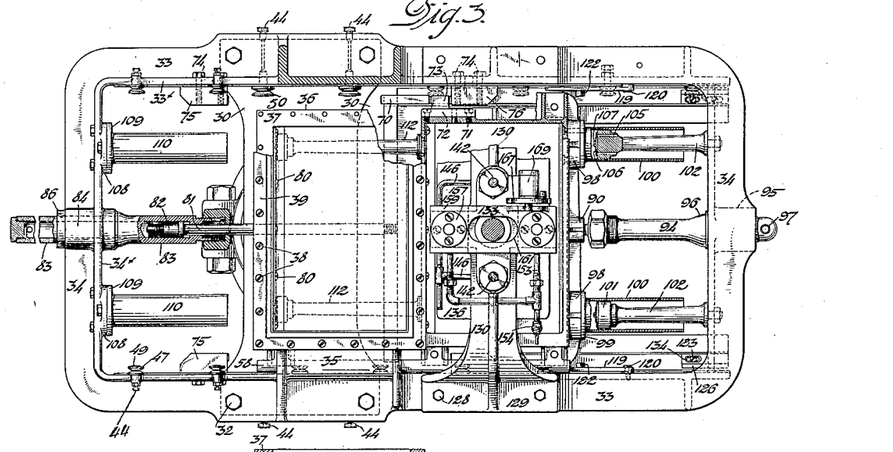
Fig. 3 is a plan of the apparatus partly in section, and Fig. 4 a side elevation, partly in section, of a portion of the structure showing certain parts not represented in Fig. 2.
Figure 4:
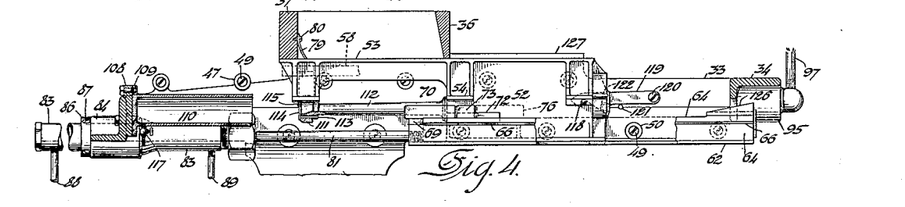
Figure 5:
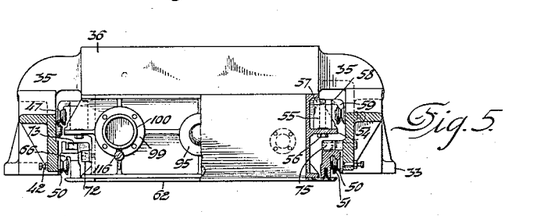
Fig. 5 is a partial sectional end elevation of the parts represented in Fig. 4, and Fig. 6 an end view of the horizontal frame with the moving parts omitted.
Figure 6:
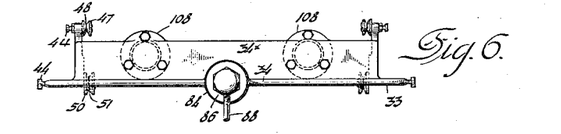
Figure 7:
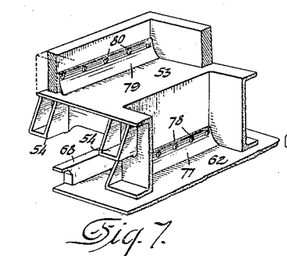
Fig. 7 is a perspective view, partly in section, representing the sand-box and sand-plate and the lower end of the sand-hopper.

The sand-box has secured to the lower portion of its inner wall on the side toward which it is retracted from the flask-filling position a yielding packing strip 77, which is preferably made of soft flexible material such as leather or rubber, being secured thereto near the upper edge by means of a series of fastening screws 78, as shown in Figs. 2 and 7. It is found in practice that the free edge of this packing strip, which is slightly inclined to the sand-plate 62, as represented in the drawings, clings to the face of the latter in such manner as to effectively strip therefrom any adhering particles of sand, thereby excluding from the joint between the bottom of the sand-box and the sand-plate any sand which would check the free retractive movement of the sand-plate and interposed grit which would impair the durability of the parts and would cut the operative face of the sand-plate. The corresponding wall of the sand-hopper curb 36 is similarly provided with a yielding packing strip 79 which is secured in place by means of the fastening screws 80, and which serves to maintain the cut-off extension-plate 53 clear of sand in its passage beneath the sand-hopper.

The cross-beam 68 of the sand-plate is provided with a central threaded aperture entered by the correspondingly threaded reduced extremity of the plunger-rod 81 whose opposite end is provided with the piston 82 fitted within a hydraulic cylinder 83 embraced by and sustained within the tubular boss 84 formed in the rearward cross member 34 of the sand-hopper supporting frame, said cylinder being provided with an annular shoulder 85 normally resting against the forward extremity of the boss 84 and with a collar 86 secured thereon by set-screws 87 and engaging the rearward extremity of the boss 84, whereby the cylinder 83 is firmly held against endwise movement upon the frame 33 34. The actuating fluid for the piston 82 is introduced in opposite ends of the cylinder 83 by means of the pipes 88 and 89.

The front wall of the sand-box is provided externally with a boss 90 having a threaded aperture 91 entered by the reduced threaded extremity 92 of the plunger-rod 93 whose opposite end portion is fitted within the hydraulic cylinder 94 having its forward end embraced by and sustained within the tubular boss 95 formed in the forward cross-member 34 of the sand-hopper supporting frame, said cylinder being provided with an annular shoulder 96 normally resting against the rearward extremity of the boss 95 which receives the thrust of the cylinder in the operation of the hydraulic ram thus constituted.

In the operation of the sand-filling portion of the apparatus, the actuation of the ram-plunger 82 by admission of fluid to the cylinder 83 through the fluid pipe 88 serves to advance the sand-plate and with it the sand-box to extreme forward or flask-filling position directly above the flask-section 9, wherein the blocks 73 are arrested by engagement with the stop-blocks 76, the cut-off plate 53 replacing the sand-box to afford a bottom for the sand-hopper. The relief of pressure in the fluid pipe 88 permits the constant fluid pressure against the forward end of the plunger 82, which is applied through the fluid-pipe 89, to retract the sand-plate 62 so as to allow the contents of the sand-box to fall into the flask 9, the retractive movement of the sand-plate being checked by engagement of the thrust-blocks 70 with the stop-blocks 75. The actuation of the ram-plunger 93 by admission of fluid through the pipe 97 into the ram-cylinder 94 serves to forcibly return the sand-box to initial retracted position beneath the sand-hopper wherein the blocks 73 engage the forward ends of the thrust-blocks 70 carried by the sand-plate, the rearward wall of the sand-plate in such movement striking off from the top of the flask section the superfluous sand which is carried back upon the retracted sand-plate after a succeeding flask-filing operation.

The front wall of the sand-box is provided externally upon opposite sides of the boss 90 with the projecting seats 98 to which are secured the flanges 99 of the dash-pot cylinders 100 open at the forward ends to admit the pistons 101 attached to the rods 102 rigidly secured to the depending web of the forward frame member 34, the forward ends of the rods 102 having reduced and threaded portions 103 entering apertures in said web and secured in position by means of the nuts 104. Each piston 101 is pierced by the longitudinal apertures 105 covered at the face of the piston by a disk 106 of flexible material, such as leather or rubber, secured to the piston by means of a screw 107.

The rearward cross member of the sand-hopper supporting frame is provided upon its forward face, upon opposite sides of the boss 84, with the projecting seats 108 to which are secured the flanges 109 of the dash-pot cylinders 110 open at their forward ends to receive the plungers 111 carried by the rods 112 secured to the rearward wall of the sand-box. The plungers 111 are provided, similarly to the plungers 101, with longitudinal air apertures 113 covered by flexible washers 114 secured to the faces of said plungers by screws 115 and serving as valves for said apertures 113. Relief cocks 116 and 117 are provided at the closed ends of the cylinders 100 and 110 to control the discharge of air from said cylinders.

In the movement of the sand-box from sand-receiving to flask-filling position, the dash-pot cylinders 100 are carried forward to be entered by the plungers 101 and the contained air acts as a cushion to prevent a violent impact with the stop members 73 and 76, the pistons 111 being retracted from their respective cylinders 110 and the space behind them being filled by air admitted through the relief apertures 113 beneath the flap-valves afforded by the flexible washers 114. In the return movement of the sand-box, a like cushioning effect is produced by the movement of the plungers 111 into the dash-pot cylinders 110, air being admitted into the inner ends of the cylinders 100 through the relief apertures 105 of the pistons 101.

To prevent the recoil of the sand-box from flask-filling position and insure the proper register of the sand-box with the flask beneath the same, an automatic locking device is provided, which consists of lateral pins 118 projecting from the forward stirrups 54 and affording shoulders for engagement with the hooked extremities 119$^x$ of the latch-levers 119 fulcrumed upon the screw-studs 120 tapped into the inner faces of the depending webs of the frame members 33. The latch levers 119 normally rest by gravity upon the stop-pins 121 with the inclined lower edges of their hooked portions 119$^x$ disposed within the path of movement of the pins 118 by which they are raised and then dropped into positive engagement therewith.

Adjustably secured upon the forward ends of the rails 64 of the sand-plate by means of screws 123 entering slots 124 therein are the feet 125 of cam-plates 126 having inclined operative edges adapted for engagement with laterally projecting roller-studs 122 upon the latch-levers 119. As represented in the drawings, both the sand-box and sand-plate are in their extreme advance or flask-filling positions, and the cam-plates 126 are disposed considerably in advance of the studs 122, but as the sand-plate reaches extreme retracted position beneath the sand-hopper, the inclined edges of the cam-plates 126 encounter the roller-studs 122 and thereby lift the latch-levers 119 to disengage their hooked ends 119$^x$ from the pins 118 to enable the sand-box to be subsequently returned to initial position.

The side members 33 of the sand-hopper supporting frame are provided in advance of the cross-beam 35 with seats 127 to which are secured by means of bolts 128 the feet 129 of an arched tucker-sustaining frame 130 formed with a bearing boss 131 provided at opposite ends with fixed bushings 132 to which is fitted the vertically movable bar 133 having its reduced lower end secured by means of the transverse pin 134 within a boss 135 of a circular plate 136 to the lower face of which is suitably secured the head 137 of the tucker 138 conforming in general outline with the pattern 12, which is shown in the present instance as a sewing machine bed-plate having its upper or operative face secured upon the exposed face of the pattern-plate 11. The bar 133 carries upon its shouldered upper end the head 139 above which projects the central pin 140 to which are applied the weighted disks 141 resting upon the head 139 and serving through the bar 133 to move the tucker 138 downwardly through the sand-box while in its advance position, as represented in Fig. 2, to pack the sand around the pattern.

Depending from opposite sides of the head 139 are the plunger-rods 142 each fitted to the bore of a hydraulic cylinder 143 arranged within a lateral socket 144 of the bearing boss 131 which is mounted within and supported by the frame 130 each plunger rod 142 has a shoulder 145 resting upon the top of the boss to sustain the downward thrust of the cylinder. Pressure is normally maintained in said hydraulic cylinders sufficient to act through the plungers 142 and the head 139 to maintain the tucker-bar 133 in retracted elevated position in opposition to the action of the weights 141, fluid being admitted to the lower ends of said cylinders through pipes 146. The relief of the pressure within the cylinder, by the automatic valve mechanism hereinafter described, permits the weights to act with a predetermined force in forcing the tucker downwardly into the sand contained in the flask for distributing and packing the same around the pattern, and the reëstablishment of the normal pressure in the cylinder, by said valve mechanism, causes the elevation of the tucker to extreme upper position and maintains the same therein preparatory to the succeeding tucking operation.

Secured to opposite sides of the boss 131 by means of the tap-screws 147 are the dash-pot cylinders 148 open at the bottom and having fitted therein the pistons 149 provided with the rods 150 which are secured to the tucker-plate 136. The pistons 149 are provided, as shown in Fig. 2, with relief apertures 151 closed by the spring-pressed flap-valves 152, and each cylinder has in its upper end the recess 148$^x$ connected together by means of the pipes 153 which are provided with the common air-cock 154 through which the cushioning air from the cylinders is discharged at a speed regulated by the air-cock. The dash-pots 148 thus afford a cushioning device to insure against violent impact of the tucking device in its operation.

In the production of sand-molds composed of cope and drag sections containing cavities substantially equivalent in size, the tucking action should be the same for both mold and cope sections; but in cases wherein the mold cavity is in the cope section only, or far exceeds in that section that portion of a cavity in the drag section, the length of traverse of the tucker in packing the sand around the pattern should obviously be varied to compensate for the different volumes of the flask sections occupied by the pattern, and the stroke of the tucker should be varied accordingly in consecutive tucking operations. Provision is therefore made according to the present improvement for limiting the movement of the tucker in successive descents thereof.

Depending from the lower face of the head 139 are the diametrically opposite contact-studs 155 adapted in the descent of the tucker to engage the stop-pins 156 or the adjacent portions of the detachable stop-disks 157 which are shown herein fitted within the circular cavities 158 of the reciprocating slide-block 159 which is preferably formed in two parts secured together by means of the screws 160 and provided with a longitudinal slot 161 embracing the tucker-bar 133. The block 159 has depending portions at opposite ends formed with longitudinal dove-tail grooves 162 fitted to the correspondingly shaped guide-blocks 163 which are secured by means of screws 164 upon the lateral lugs 131$^x$ of the boss 131. The length of traverse of the tucker-bar 133 is therefore dependent upon the position of the block 159, its downward movement being arrested earlier when the contact-studs 155 engage the pins 156 than when they strike the disks 157.

The block 159 is provided in one edge, and near one of its ends, with the vertical guide-slot 165 entered by the crank-pin 166 of a ratchet-disk 167 which is formed with a series of external pockets 168, the disk 167 being sustained by a stud mounted in the bearing boss 169 having a foot 169$^x$ bolted to the bearing boss 131.

Secured upon the top of the tucker-plate 136 is the socket-piece 170 in which is secured the stud 171 carrying a block 172 formed with the laterally and upwardly extending stop-arm 173 and with an ear 174 upon which is pivotally mounted by means of the transverse pin 175 the pawl-lever 176 carrying at its upper end the roller-stud 177 adapted to enter successively the peripheral pockets 168 of the ratchet-disk 167 for turning the latter. To one edge of the block 172 opposite the stop-arm 173 is secured the flat spring 178 normally pressing the lever 176 into contact with the stop-arm. To the lever 176 is adjustably secured by means of the screws 179 the cam-block 180 formed with slots 181 to receive the fastening screws 179 and provided with the concave cam-edge 182 adapted in the upward movement of the lever 176 with the tucker-bar 133 to engage a roller-stud 183 mounted upon a lateral extension 184 of the bearing boss 131.

In the descent of the tucker for a tucking operation, the roller-stud 177 rides down one of the eccentric portions of the periphery of the ratchet disk 167, its spring 178 permitting it to be thrust aside by such engagement and causing it to snap into alinement with one of the pockets as it regains its contact relation with the stop-arm 173. In the upward movement of the tucker-bar 133, the lever 177 is carried upwardly into one of the pockets 168 of the ratchet-disk and imparts to the same a quarter-turn, being disengaged therefrom at the proper point by the action of the roller-stud 183 upon the cam-block 180.

As the cam-block 180 is adjustable upon its supporting lever 176, it will be seen that the rotation of the ratchet-disk may be accurately determined. As will be obvious, the movement of the ratchet-disk through a quarter-turn will cause the slide-block 159 to move a half step of its entire traverse in one or the other direction, so as to bring the pins 156 alternately into and out of the range of movement of the contact-studs 155. Inasmuch as the action of the pawl-lever 176 upon the ratchet-disk 167 takes place at the upper end of the stroke of the tucker-bar 133, as indicated in Figs. 2 and 15, the movements of the ratchet-disk are uniform regardless of the length of stroke of the tucker-bar.

To insure the effective actuation of the several hydraulic-rams for coöperation of the several operative members which they operate, each of the fluid pipes connected therewith is controlled by valves disposed within a common valve-chest and deriving movements from their respective cams on a common cam-shaft connected with the turret-actuating means, as shown and described more fully in my application filed simultaneously herewith. To this end, the valve-chest 185 is provided with the longitudinal supply and exhaust chambers 186 and 187, respectively, and an intermediate series of in dependent distributing chambers 188. The supply and exhaust chambers are connected respectively with the supply and exhaust pipes 189 and 190 tapped into the bottom of the casing, and each of the distributing chambers is connected at the lower side with a pocket 191 in communication with one of a series of distributing or service pipes 192, 193, 194, 195 and 196 also leading from the bottom of the valve-chest; these service pipes being led to the different parts of the apparatus.

The casing is provided with a series of transverse bushings 197 provided with annular series of apertures 198 communicating with the ports 186, 187 and 188, respectively, and each has fitted therein a piston 199 connected with a rod 200 which has a pivotal connection with one end of a link-bar 201 whose opposite end portion 202 is forked to embrace the cam-shaft 203 and provided with a lateral roller-stud 204 entering the cam-groove 205 in one of the cam-disks 206, 207, 208, 209 and 210, fixed upon the shaft 203. The grooves 205 of the several cam-disks are of suitable form to produce the required movements of the valve-pistons 199 for connecting at the proper times the distributing chambers 188 with the supply and exhaust chambers 186 and 187.

Figures 10, 11, 12, 13, 14:
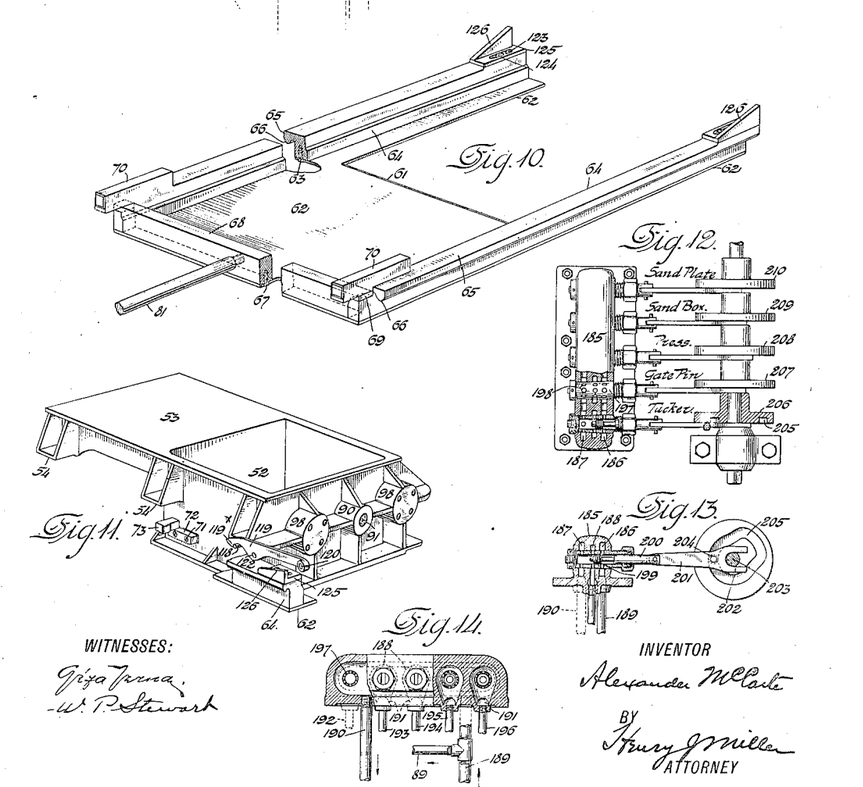

In practice, the fluid pipes 146 for controlling the action of the tucker are connected with the delivery pipe 192 and are controlled each by its respective valve operated by the cam 206. The delivery pipes 193 and 194 are connected with the hydraulic-rams operating the gate-pin and the mold-compressing platen, respectively, and the delivery pipes 195 and 196, whose valves are controlled by the cams 209 and 210 are connected with the sand-box fluid pipe 97 and sand-plate pipe 88. The sand-plate return fluid pipe 89 is connected, as represented in Fig. 14, with the supply pipe 189 by means of which a constant pressure is applied to the forward face of the piston 82 and which is overcome in the advance of the sand-plate by the pressure in the rearward end of the cylinder 83 upon the entire area of the piston 82.

From the foregoing description, it will be seen that the present improvement involves somewhat novel principles of construction and operation of flask-filling apparatus, in the manner of manipulation of the sand-box and sand-plate in conveying sand from the hopper to the flask, in the safeguards against the penetration of sand into the joints between the moving parts, in the actuation and control of the tucker, and in various constructive features, and it is therefore evident that the present embodiment is susceptible of material modification in various ways without departure from the scope of the present invention.

Having thus set forth the nature of the invention, what I claim herein is:—

1. The flask-filling apparatus comprising a sand-box movable into and out of operative relation with the flask to be filled, a sand-plate affording a bottom for the sand-box throughout its movements between extreme positions, sand-plate actuating means, sand-box actuating means for operating the sand-box to strike off the superfluous sand from the flask after the filling operation, a tucking member adapted to enter the flask through the sand-box, and actuating means for the tucking member operative between the advance movement of the sand-box to operative relation with the flask and the return thereof to initial position.

2. The flask-filling apparatus comprising a sand-box movable into and out of operative relation with the flask to be filled, a sand-plate sustained independently of the sand-box and affording a bottom for said sand-box throughout its travel between extreme positions, automatic actuating means whereby the sand-box and sand-plate are intermittently advanced and both are simultaneously arrested in operative relation with the flask and the sand-plate is thereafter retracted, and independently acting means whereby at the end of said retraction of the sand-plate the sand-box is automatically returned to initial position.

3. The flask-filling apparatus comprising a sand-box movable into and out of operative relation with the flask to be filled, an independently sustained sand-plate affording a bottom for said sand-box throughout its travel between extreme positions and movable relatively to the same, sand-plate actuating means whereby the sand-plate may be moved into and out of operative relation with the flask, an operative connection between said sand-plate and sand-box whereby the latter is advanced into said operative relation, and automatic means controlled independently of the sand-plate and its actuating means for retracting the sand-box into initial position.

4. The flask-filling apparatus comprising a sand-box movable into and out of operative relation with the flask to be filled, an independently sustained sand-plate affording a bottom for said sand-box and movable relatively thereto, actuating means connected respectively with the sand-box and sand-plate and each controlled independently of the other, and means for esestablishing an operative connection between the sand-box and sand-plate during their travel in one direction only.

5. The flask-filling apparatus comprising a sand-box movable into and out of operative relation with the flask to be filled, an independently sustained sand-plate affording a bottom for said sand-box and movable independently thereof, means for advancing both the sand-box and sand-plate simultaneously to carry a charge of sand over the unfilled flask and for returning the sand-plate to initial position, and independently operating means for thereafter automatically returning the sand-box to initial position for a succeeding charge of sand.

6. The flask-filling apparatus comprising a sand-box adapted for movement between sand-receiving and flask-filling positions, an independently sustained sand-plate affording a bottom for said sand-box and movable independently thereof, a common actuator for effecting the travel of both sand-box and sand-plate simultaneously in one direction between extreme positions wherein each assumes a position in register with the other, and independently operating means for insuring the automatic return to initial position of the sand-plate and sand-box successively in the order named.

7. The flask-filling apparatus comprising a sand-box adapted for movement between sand-receiving and flask-filling positions, a sand-plate affording a bottom for said sand-box and movable independently thereof and coextensively therewith, independent means connected with each of said independently movable elements and acting thereon respectively in opposite directions to impart thereto traveling movements between extreme positions, and a connection between the sand-plate and sand-box whereby the initial movement of one of said elements is communicated to the other of said elements.

8. The flask-filling apparatus comprising a sand-box adapted for movement between sand-receiving and flask-filling positions, a sand-plate affording a bottom for said sand-box and movable independently thereof, means connected with each of said independently movable elements and each controlled independently of the other for action thereon respectively in opposite directions to impart thereto traveling movements between extreme positions and for imparting to one of said elements movements in both directions, and means coacting with the sand-plate and sand box whereby the initial movement of one of said elements is communicated to the other of said elements.

9. The flask-filling apparatus comprising a sand-box adapted for movement between sand-receiving and flask-filling positions, a sand-plate affording a bottom for said sand-box and movable independently thereof, positively and successively acting hydraulic rams connected respectively with the sand-plate and sand-box for imparting operative movements thereto, and a connection between the sand-box and sand-plate whereby the advance of one of said elements carries the other into flask-filling position.

10. The flask-filling apparatus comprising a sand-box adapted for movement between sand-receiving and flask-filling positions, a sand-plate affording a bottom for said sand-box and movable independently thereof, a double-acting hydraulic ram connected with the sand-plate for imparting thereto movements out of and into initial position, a single-acting hydraulic ram connected with the sand-box for imparting thereto its movements into initial position, and means coacting with the sand-box and sand-plate whereby in its advance from initial position the sand-plate carries the sand-box with it.

11. The flask-filling apparatus comprising a frame, a sand-box movable into and out of operative relation with the flask to be filled, a sand-plate affording a bottom for said sand-box and movable independently thereof, means for advancing the sand-box and sand-plate simultaneously to carry a charge of sand over the unfilled flask and for returning the sand-plate to initial position, independently operating means for thereafter automatically returning the sand-box to initial position, a series of anti-friction bearing rollers for sustaining the sand-box upon the frame, and a series of anti-friction bearing rollers for sustaining the sand-plate upon said frame independently of the sand-box.

12. The flask-filling apparatus comprising a frame, a sand-box, a sand-plate affording a bottom for said sand-box, automatic actuating means for simultaneously advancing the sand-box and sand-plate to carry a charge of sand over the unfilled flask and for retracting said sand-plate, independently operating means for automatically returning the sand-box to initial position, anti-friction bearing rollers for sustaining the sand-box, and a series of anti-friction bearing rollers for sustaining the sand-plate upon said frame independently of the sand-box.

13. The flask-filling apparatus comprising a frame, a sand-box movable into and out of operative relation with the flask to be filled, a sand-plate affording a bottom for said sand-box and movable relatively to the same, actuating means for imparting to the sand-box and sand-plate their operative movements, and sustaining means whereby the sand-box and sand-plate are supported respectively upon said frame and comprising pairs of rails secured to the one and grooved anti-friction rollers in rolling contact with such rails and journaled upon studs sustained by the other.

14. The flask-filling apparatus comprising a frame provided with series of studs with anti-friction rollers journaled thereon, a sand-box movable into and out of operative relation with the flask to be filled, a sand-plate affording a bottom for said sand-box and movable relatively to the same, pairs of rails secured respectively to said sand-box and sand-plate and each adapted to rest upon one of said series of anti-friction rollers, and actuating means for imparting to the sand-box and sand-plate their operative movements.

15. The flask-filling apparatus comprising a frame, a sand-box, a sand-plate movable independently of the sand-box, cushioning means interposed between said frame and the aforesaid members and actuated by the movement thereof, automatic means for simultaneously advancing said sand-box and sand-plate and for retracting said sand-plate, and independent means for automatically returning said sand-box to initial position after a predetermined period of rest.

16. The flask-filling apparatus comprising a frame, a sand-box, a sand-plate movable independently of the sand-box automatic means for simultaneously advancing said sand-box and sand-plate and retracting said sand-plate, independently operating means for automatically returning the sand-box to initial position, and cushioning means interposed between the sand-box and said frame comprising a cylinder and a piston fitted thereto, one of which is secured to the frame and the other of which is carried by one of said moving elements.

17. The flask-filling apparatus comprising a reciprocating sand-box, a sand-plate affording a bottom for the same and movable relatively thereto, actuating means for imparting operative movements to the sand-box and sand-plate, and an automatically acting locking device applied to the sand-box for detaining it against recoil at the end of its movement to extreme flask-filling position.

18. The flask-filling apparatus comprising a reciprocating sand-box, a sand-plate affording a bottom for the same and movable relatively thereto, actuating means for imparting operative movements to the sand-box and sand-plate, an automatically acting locking device applied to the sand-box for detaining it against recoil at the end of its movement to extreme flask-filling position, and means connected with and actuated by the retrograde movement of the sand-plate in rendering said locking device ineffective.

19. The flask-filling apparatus comprising a frame, a reciprocating sand-box mounted thereon, a sand-plate mounted upon said frame and affording a retractable bottom for the sand-box, actuating means for imparting operative movements to the sand-box and sand-plate, locking means between the frame and the sand-box and including a latch-lever mounted upon the one and a shoulder upon the other whereby the sand-box is detained against recoil at the end of its traverse to flask-filling position, and a cam member carried by the sand-plate for disengaging the latch-lever from said shoulder.

20. The combination with a flask-support, of a frame comprising upper and lower sections, the lower of which is constructed with a base and a standard rising therefrom and the upper section is formed with a sleeve embracing said standard and provided with means for its axial adjustment upon said standard, a stationary sand-hopper mounted upon the upper frame-section above and at one side of the flask-support, and a reciprocating sand-box and a reciprocating sand-plate movable relatively thereto mounted upon the upper frame-section and adapted for movement between extreme sand-receiving and flask-filling positions in register respectively with said hopper and the flask-support.

21. The combination with a flask-support, of a frame comprising upper and lower sections, the lower of which is constructed with a base and a standard rising therefrom and the upper section is formed with a sleeve embracing said standard and provided with means for its axial adjustment upon said standard, said frame being provided with positively acting means for preventing the turning of one section upon the other and with means for securely clamping said sleeve upon the standard which it embraces, a stationary sand-hopper mounted upon the upper frame-section above and at one side of the flask-support, and a reciprocating sand-box and a reciprocating sand-plate movable relatively thereto mounted upon the upper frame-section and adapted for movement between extreme sand-receiving and flask-filling positions in register respectively with said hopper and the flask-support.

22. The flask-filling apparatus comprising a sand-box movable into and out of operative relation with the flask to be filled, a sand-plate affording a bottom for said sand-box and movable relatively to the same, actuating means for moving the sand-box and sand-plate simultaneously into operative relation with the flask and for thereafter retracting the sand-plate and afterward the sand-box across the top of the flask, a tucking member adapted to enter the flask through the sand-box, and hydraulically controlled means for imparting an operative reciprocating movement to said tucking member while the sand-box is in flask-filling position.

23. The combination with a flask-support and flask-filling means, of a frame, a tucking member supported by said frame and movable toward and from said flask-support, weight-actuated means for imparting to the tucking member its operative movements toward the flask-support, a hydraulic ram for retracting the tucking member into initial position, cushioning means mounted on the frame and coacting with said tucking member, and automatically acting valves for intermittently actuating said hydraulic ram.

24. The combination with a flask-support and flask-filling means, of a tucking member movable toward and from said flask-support, actuating means for imparting reciprocatory movements to said tucking member, and means for varying the length of traverse of said member.

25. The combination with a flask-support and flask-filling means, of a tucking member movable toward and from said flask-support, actuating means for imparting reciprocatory movements to said tucking member, and automatically acting means for varying the length of traverse of said member in successive reciprocations thereof.

26. The combination with a flask-support and flask-filling means, of a tucking member movable toward and from said flask-support, actuating means for imparting reciprocatory movements to said tucking member, a plurality of stops adapted for engagement by a contact element connected with the tucking member, and automatically acting means for shifting said stops successively into operative relation with said contact element.

In testimony whereof, I have signed my name to this specification, in the presence of two subscribing witnesses.

ALEXANDER McCARTE.

Witnesses:
D. P. BUNIE,
W. P. STEWART.